United States Patent [19]
Applebaum

[11] 3,979,068
[45] Sept. 7, 1976

[54] SPRAY NOZZLE ASSEMBLY FOR A WINDSHIELD OF AN AUTOMOBILE

[75] Inventor: Beverly Applebaum, Toronto, Canada

[73] Assignee: Lawrence Peska Associates, Inc., New York, N.Y. ; a part interest

[22] Filed: July 14, 1975

[21] Appl. No.: 595,670

[52] U.S. Cl. .......................... 239/284 R; 239/520; 239/550
[51] Int. Cl.² ...................... B60S 1/52; B05B 1/10; B05B 1/26
[58] Field of Search .......... 239/284, 499, 518, 520, 239/521, 523, 550, 565, 600, 601

[56] References Cited
UNITED STATES PATENTS

| | | | |
|---|---|---|---|
| 2,126,440 | 8/1938 | Apthorp | 239/600 |
| 2,126,624 | 8/1938 | Eaddy | 239/284 |
| 3,067,955 | 12/1962 | Heath | 239/284 X |
| 3,199,787 | 8/1965 | Oishei et al. | 239/284 |
| 3,201,050 | 8/1965 | Simmons et al. | 239/499 X |
| 3,213,493 | 10/1965 | Chichester | 239/284 X |

FOREIGN PATENTS OR APPLICATIONS

| | | | |
|---|---|---|---|
| 1,814,686 | 6/1970 | Germany | 239/284 |
| 1,071,420 | 6/1967 | United Kingdom | 239/284 |

*Primary Examiner*—John J. Love
*Assistant Examiner*—Andres Kashnikow
*Attorney, Agent, or Firm*—Richard E. Nanfeldt

[57] ABSTRACT

A spray nozzle assembly for a windshield of an automobile includes a housing having at least one upwardly extending vertical wall and an interior chamber therein, wherein a plurality of passageways extend outwardly from said interior chamber. A mounting leg having a continuous bore therethrough is affixed onto the housing, wherein the bore communicates with the interior chamber. The leg is adapted to be received by a fluid supply assembly. A plurality of spray nozzle members are embedded into passageways, wherein the spray nozzle members are recessed into the upwardly extending wall. A deflector shield is affixed onto the housing for deflecting the fluid spray toward the windshield of the automobile.

3 Claims, 5 Drawing Figures

U.S. Patent   Sept. 7, 1976   3,979,068
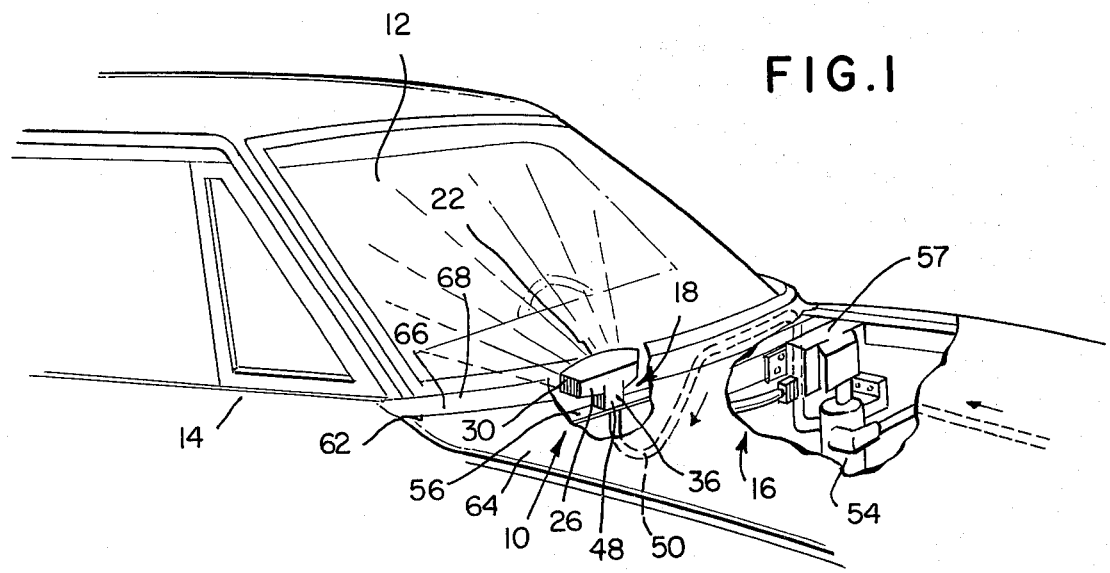
FIG.1
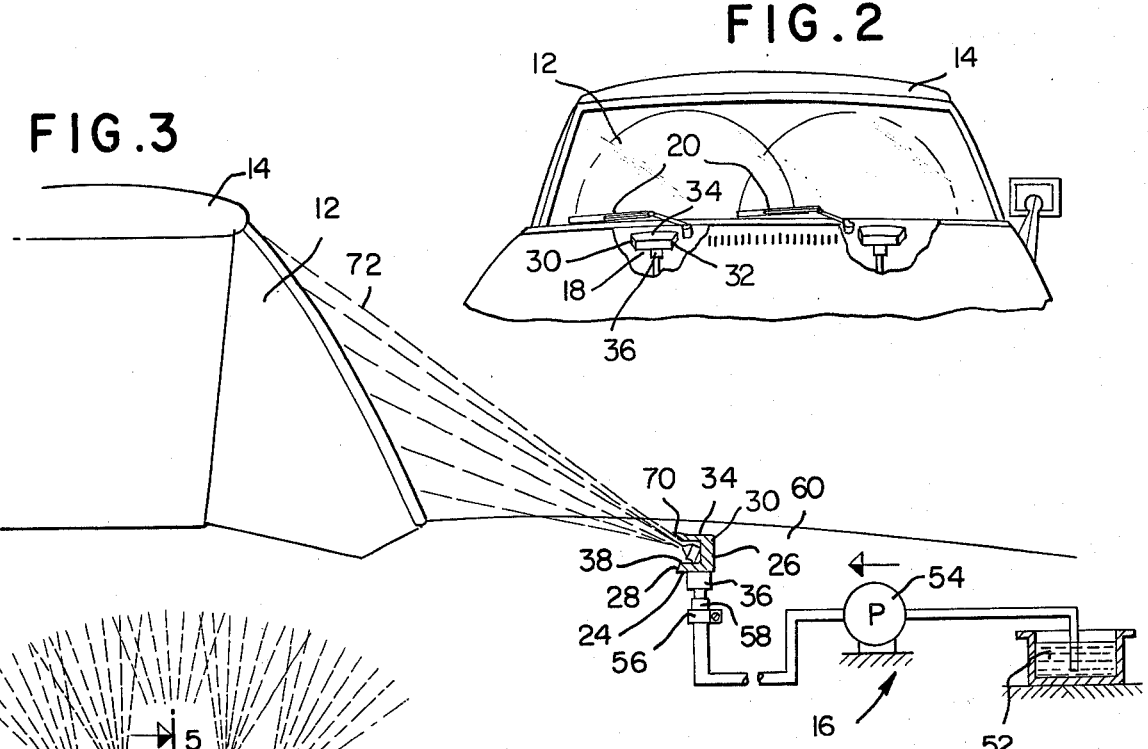
FIG.2
FIG.3
FIG.4
FIG.5

SPRAY NOZZLE ASSEMBLY FOR A WINDSHIELD OF AN AUTOMOBILE

BACKGROUND OF THE INVENTION

My present invention relates to a unique and novel spray assembly for distributing a fluid spray of maximum distribution onto the windshield of an automobile.

A number of U.S. Pat. Nos.: 2,898,036; 3,067,955; and 3,403,859 have employed variously designed spray assemblies for a windshield of an automobile, but these aforementioned patents produce a single stream of water incapable of giving a maximum distribution of the fluid spray onto the windshield as in my present invention.

An object of my present invention is to provide a nozzle spray assembly of simple design and relatively low manufacturing cost for the windshield of an automobile, wherein the nozzle spray assembly produces a fluid spray of maximum distribution.

SUMMARY OF THE INVENTION

Briefly, my present invention comprises a housing having at least one upwardly extending vertical wall and an interior chamber therein, wherein a plurality of passageways extend outwardly from said interior chamber. A mounting leg having a continuous bore therethrough is affixed onto the housing, wherein the bore communicates with the interior chamber. The leg is adapted to be received by a fluid supply assembly. A plurality of spray nozzle members are embedded into passageways, wherein the spray nozzle members are recessed into the upwardly extending wall. A deflector shield is affixed onto the housing for deflecting the fluid spray towards the windshield of the automobile.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a cutaway view of an automobile having a spray nozzle assembly;

FIG. 2 illustrates a front view of the automobile having two spray nozzle assemblies;

FIG. 3 illustrates a side cross-sectional view of the automobile having the spray nozzle assembly;

FIG. 4 illustrates a top cross-sectional view of the spray nozzle assembly; and

FIG. 5 illustrates a side cross-sectional of the spray nozzle assembly.

DESCRIPTION OF THE PREFERRED EMBODIMENT

Turning now descriptively to the drawings, in which similar reference characters denote similar elements throughout the several views, FIGS. 1–3 show a spray nozzle assembly 10 for a windshield 12 of an automobile 14 adapted to be coupled to a fluid supply assembly 16 of the automobile 14. The spray nozzle assembly 10 comprises two units 18, wherein one unit 18 is positioned in front of each windshield wiper 20. Each unit 18 comprises a housing 22 having a base 24, an upwardly extending rear wall 26, an upwardly extending front wall 28 of a longer length than the rear wall 26, a pair of upwardly extending distal end walls 30, 32, a top 34, wherein the front wall 28 has a convex curvative. A mounting leg 36 extends downwardly from base 24, wherein the housing 22 and leg 36 are of a unitary construction. An elongated slot aperture 38 is centrally contained in the front wall 28, wherein aperture 38 extends from one end to the other end of the front wall 28.

The housing 22 contains an interior elongated chamber 40 therein as shown in FIG. 4, 5. A plurality of passageways 42 extend outwardly from the interior chamber 40 to the vertical inside face 44 of aperture 38; wherein the outer ends of the passageways 42 are evenly distributed over face 44. The passageways 42 are directed outwardly at a plurality of angles relative to the lateral median of the housing 22. The leg 36 has a continuous bore 46 therethrough, wherein the bore 46 communicates in a fluid connection to chamber 40.

The lower end 48 of leg 36 is adapted to receive the fluid supply line 50 of assembly 16 as shown in FIGS. 1, 2, wherein the assembly 16 consists of a fluid reservoir 52, a fluid pump 54, and an electric control means 57 for controlling the fluid pump 54. The lower end 48 of the leg 36 is mounted on top of a bracket 56 by means of a clamp means 58, wherein the bracket 56 is contained in the engine compartment 60. The leg 36 extends upwardly between the rear edge 62 of the engine hood 64 and the forward edge 66 of the cowl 68 of the automobile 14, wherein the housing 22 is disposed externally to the automobile 14 with the front wall 28 of the housing 22 directed towards the windshield 12.

As shown in FIGS. 3–5, a flange member 70 extends upwardly at an obtuse angle and outwardly from the upper edge of the front wall 28, wherein the flange member 70 is of an unitary construction with the housing 22. The flange member 70 functions as a fluid spray deflector shield so as to deflect the fluid spray 72 towards the windshield 12 and to prevent the fluid spray 72 from projecting itself upward and over the windshield 12. A spray nozzle member 74 is embedded in a fluid tight seal into the outer end of each passageway 42, wherein the spray nozzle members 74 are positioned at a plurality of angles so as to give a maximum distribution of the fluid spray 72 on the windshield 12. Each spray nozzle member 74 consists of an outer conical shaped section 76 having a cylindrically shaped rod section 78 extending linearly outward from a base 80 of section 76. The two sections 76, 78 have a continuous tapered bore 82 therethrough, wherein bore 82 extends from the free end 84 of section 78 to a pinhole aperture 85 in the apex 86 of section 76. The free end 84 of section 78 of each member 74 is contained in the outer end of each passageway 42.

In use, the fluid is transported upwardly through bore 46 into chamber 40, wherein the fluid is forced outwardly from the chamber 40 through the tapered end of bore 82 at the pinhole aperture 85 of each member 74.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A spray nozzle assembly for a windshield of an automobile adapted to be coupled to a fluid supply assembly of said automobile, which comprises:
   a. a housing having a base, a top, a pair of upwardly extending distal end walls, an upwardly extending rear wall, an upwardly extending front wall with an elongated slotted aperture therein, an interior chamber, and a plurality of passageways extending between said interior chamber and said slotted aperture, said front wall being longer than said rear wall;
   b. a mounting leg having a continuous bore therethrough affixed to said housing, said bore communicating in a fluid serial connection with said interior chamber, said mounting leg adapted to be mounted on a bracket member affixed to said automobile;
   c. a spray nozzle member affixed into each said passageway, said nozzle members in combination adapted to direct a spray of fluid onto said windshield, each said nozzle spray member angled relative to a latitude median of said housing, each said nozzle member including an outer conical section having a base and an apex with a pinhole aperture therein and a cylindrically shaped rod section affixed linearly to said base, said conical and said rod section having a continuous tapered bore therethrough, said rod section mounted into said passageway, each said spray nozzle member recessed into said front wall; and
   d. a water deflector shield affixed onto said housing, said deflector shield deflecting said fluid spray onto said windshield, said deflector shield, said mounting leg, and said housing are of a unitary construction.

2. A spray nozzle assembly according to claim 1, wherein on said upwardly extending wall has convex curvative.

3. A spray nozzle assembly according to claim 2, wherein said deflector shields extends upwardly and outwardly at an obtuse angle from upper edge of said one upwardly extending wall.

* * * * *